United States Patent [19]

Sou

[11] 4,393,813
[45] Jul. 19, 1983

[54] WATERING DEVICE FOR PET ANIMALS

[76] Inventor: Teho Sou, 7-18 Higashiimazato 2-chome, Higashinari-ku, Osaka, Japan

[21] Appl. No.: 278,854

[22] Filed: Jun. 29, 1981

[51] Int. Cl.³ .............................................. A01K 7/00
[52] U.S. Cl. ................................................ 119/72.5
[58] Field of Search ................ 119/72, 72.5; 222/546, 222/547, 563, 564

[56] References Cited

U.S. PATENT DOCUMENTS

| 3,434,636 | 3/1969 | Kachman | 222/563 X |
| 3,752,124 | 8/1973 | Gabriel | 119/72.5 |
| 3,958,535 | 5/1976 | Salvia | 119/72.5 |

FOREIGN PATENT DOCUMENTS

| 358351 | 12/1961 | Switzerland | 222/563 |

*Primary Examiner*—Robert P. Swiatek
*Attorney, Agent, or Firm*—Trexler, Bushnell & Wolters, Ltd.

[57] ABSTRACT

A watering device for pet animals is disclosed, wherein a sucking pipe is attached to a hermetically sealed water-container, through a suction port of which a pet animal can water any time it likes. Loaded into the sucking pipe is a leak-preventing plug which is provided with a through hole communicating with the water container. With such an arrangement, the pet animals can draw the water in the water container through the through hole of the leak-preventing plug. The leak-preventing plug has on its outer circumferential surface a plurality of collars with the object of hermetically sealing the gap between itself and the sucking pipe.

3 Claims, 3 Drawing Figures

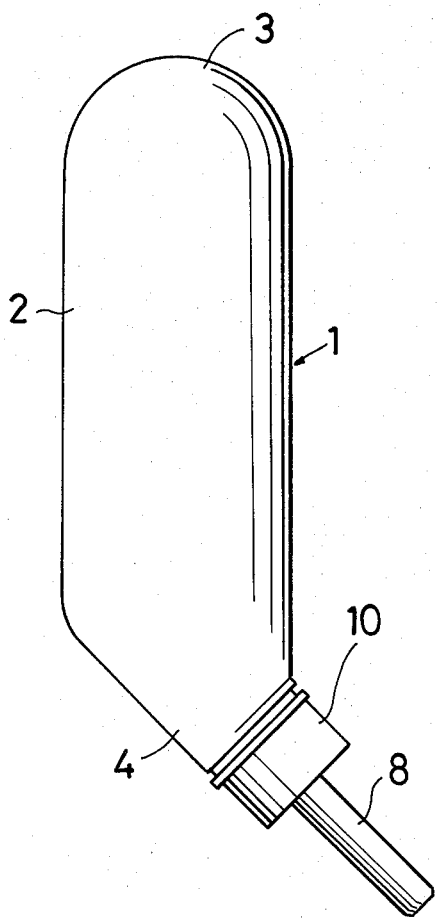
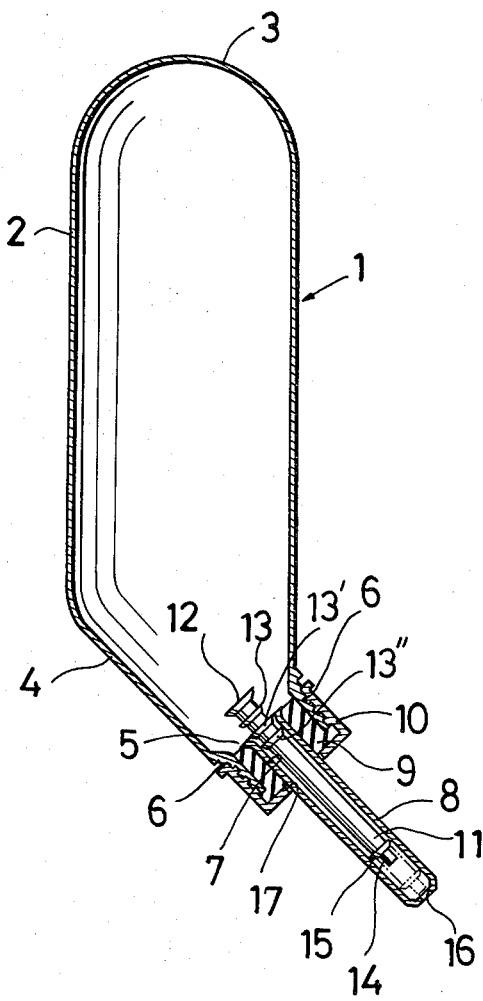
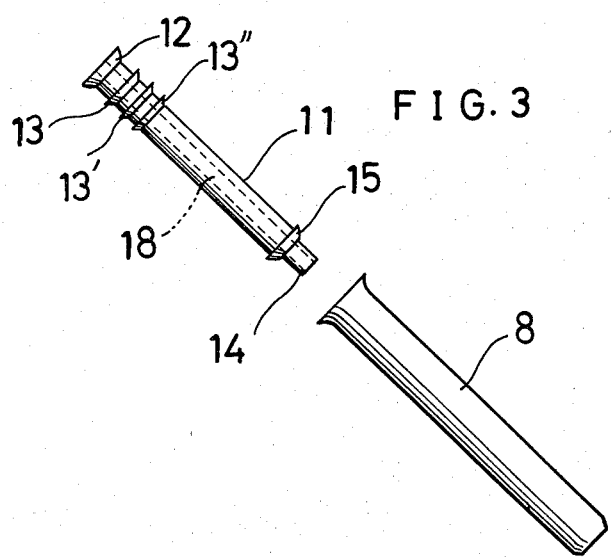

WATERING DEVICE FOR PET ANIMALS

SUMMARY OF THE INVENTION

This invention relates to a watering device for pet animals.

Watering devices fitted with sucking pipes heretofore in use were mounted on the side or top part of a cage or case for pet animals, for example, such as dogs, cats or mice in such a manner that these pet animals might be able to water therefrom as freely as they liked. These kinds of watering devices, however, often gave rise to the leakage of water from the part of the sucking pipe, and consequently puddles were liable to be formed within the pet case, thereby producing an unsanitary state. In addition, frequently the water ran out without the owner's knowledge.

For all that, it may be possible to prevent more or less the above mentioned defects of the watering device conventionally used, if the suction port of the sucking pipe is made narrower in diameter. Be the matter as it may, even if the suction port alone of the sucking pipe made of stainless steel as before would be narrowed, the sucking pipe becomes expensive for reasons of manufacturing processes, as a result involving the rise in price of the whole watering device itself.

Under these circumstances, it is an object of the present invention to provide a novel watering device for pet animals, which is inexpensive to manufacture and has the ability to prevent the leakage of water.

It is another object of the present invention to provide a watering device for pet animals being fitted with a low-priced leakage-preventing plug made of plastics which is able to be loaded into the metallic pipe heretofore in use.

It is a further object of the present invention to provide a watering device for pet animals being fitted with a leakage-preventing plug made of plastics, and yet precluding the possibility of being gnawed by pet animals.

It is still a further object of the present invention to provide a watering device for pet animals being fitted with a leakage-preventing plug which can be loaded easily and prevent the leakage certainly.

Other and further objects of the present invention will become obvious in the following detailed description taken in connection with an embodiment thereof.

BRIEF DESCRIPTION OF THE DRAWINGS

FIG. 1 is a side view of the whole body of a watering device according to the present invention;

FIG. 2 is a vertical sectional view of the whole body of a watering device according to the present invention; and FIG. 3 is an exploded perspective view showing a leakage-preventing plug drawn out of a sucking pipe according to the present invention.

DETAILED DESCRIPTION

In FIGS. 1 and 2, the reference numeral 2 indicates a water container, a portion of the whole body of a watering device 1. This container 2 is so made of transparent or semitransparent plastics in an almost cylindrical shape that the quantity of water therein may be easy to observe from outside. The top part 3 of it is molded into a semispherical form while the lower part 4 is bent in the frontal direction and narrowed in inner diameter to form an opening part 5 of the water container 2. On the outer circumferential surface of the opening part 5, a screw 6 is externally threaded, on the one hand, while on the other a packing rubber 9 is inserted along the inner circumference of the opening part 5 with a sucking pipe 8 inserted in a through hole 7 of the central part thereof. Then, an internally threaded cap 10 which correspondingly engages with the above screw 6 is put thereon so as to prevent the packing rubber 9 from coming out. Of course, this cap 10 also has a hole 17 into which the sucking pipe 8 is allowed to be inserted. Finally, when a leakage-preventing plug 11 has been pressed in the sucking pipe 8, the whole body of the watering device 1 according to the present invention is brought to completion.

In FIG. 3 which is an enlarged and exploded side view showing the sucking pipe 8 together with the leakage-preventing plug 11, the latter is molded of plastics in the form of a cylinder having an almost cylindrical through-hole 18 inside. This leakage-preventing plug 17 is formed at its upper end integrally with a flange 12, and further it is provided at its outer circumferential surface on the slightly lower part than the flange 12 integrally with three collars 13, 13', 13" at regular intervals downward. The lower end part 14 of the leakage-preventing plug 11 is made in the half size of its upper part, and the boundary between the upper and lower parts is formed integrally with a collar 15 having the equal breadth to the foregoing three collars 13, 13', 13".

In this connection, it does not matter if the sucking pipe 8 would be made of any kind of materials, exclusive of plastics and the like which are threatened to be gnawed by pet animals. However, it is best of all desirable to use pipes made of some metal. The sucking pipe 8 used here is a metallic tube plated in order to prevent rusting, usually made of stainless steel.

As for the length of the leakage-preventing plug 11, it will do if it is somewhat larger than that of the sucking pipe 8. However, in pressing the leakage-preventing plug 11 into the sucking pipe 8, the press-in operation should be preformed in such a manner that at least lower two collars 13', 13" out of the upper three collars 13, 13', 13" of the leakage-preventing plug 11 may be located completely within the sucking pipe 8, at the same time that the lower end part 14 of the leakage-preventing plug 11 may be so situated as not to protrude from the suction port 16 of the sucking pipe 8, thereby preventing the lower end part 14 from a fear of being gnawed by pet animals. Incidentally, here is so designed that the outer diameters of three collars 13, 13', 13" of the upper part of the leakage-preventing plug 11 and that of the collar 15 of the lower part may be equal to the inner diameter of the sucking pipe 8, whereby the leakage-preventing plug 11 should not come cut from the sucking pipe 8 or become shaky in the interior thereof. Out of these collars, the ones 13', 13", and 15, which are to be inserted into the sucking pipe 8, adhere closely to the inner circumferential surface of the sucking pipe 8, shut tightly the gap between the leakage-preventing plug 11 and the sucking pipe 8, and prevent the circulation of air. These collars 13', 13", and 15 are easy to adapt themselves to the unevennesses and crooks on the inner circumferential surface of the sucking pipe 8, if any, and consequently they have a higher degree of leak proof as compared with the case where the whole of the outer circumferential surface of the leakage-preventing plug 11 is made to adhere closely direct to the inner circumferential surface of the sucking pipe 8, and they are easy to be loaded into the sucking pipe 8 as well. If the lower end part 14 of the leakage-preventing plug 11 only does not protrude from the sucking pipe 8, it is allowable to press the leakage-preventing plug 11 forward the state shown in FIG. 2 further to the side of the lower part of the sucking pipe 8. In this way, when the leakage-preventing plug 11 is inserted into the sucking pipe 8 extending over its nearly full length, as indicated in FIG. 2 by the imaginary line, then the flange 12 on the upper end of the leakage-preventing plug 11 comes to impinge against the upper end face of the sucking pipe 8 to position the leakage-preventing plug 11 in the longitudinal direction, wherethrough the leakproof state between the leakage-preventing plug 11 and the sucking pipe 8 becomes more and more accomplished. It is for this end that the flange 12 at the upper end of the leakage-preventing plug 11 is formed larger in diameter than the inner diameter of the sucking pipe 8.

In the above, although the invention has been described in its preferred embodiment, it is to be understood that the invention is not limited only to this description, and further that various changes and modifications may be made within the spirit and scope as set out in the accompanying claims.

What is claimed is:

1. A watering device for pet animals, which comprises; an elongated sucking pipe extending downwardly from a hermetically sealed water container, and being so configured that pet animals can water from a suction port at the lower end of said sucking pipe; said sucking pipe comprising an elongated hollow cylinder of predetermined internal diameter open at both ends and made of a hard material which is not damaged by biting and chewing and an elongated cylindrical leakage-preventing plug disposed entirely within said hollow cylinder and container and having a longitudinal base of lesser diameter than said predetermined internal diameter, said plug being made of a material susceptible to damage by biting and chewing and being located protectively within said sucking pipe such that it cannot be contacted directly by said animals, said plug having engagement means on its outer surface for retaining it within said cylinder.

2. A watering device for pet animals as set forth in claim 1, wherein said leakage-preventing plug, has its exit end disposed within said sucking pipe.

3. A watering device for pet animals as set forth in claim 1 or 2, wherein said leakage-preventing plug is molded of plastic, said engagement means comprise integral collars which engage closely the inner circumferential surface of said sucking pipe.

* * * * *